June 25, 1935.  E. E. MAUREY  2,006,145
PULLEY
Filed Oct. 31, 1932
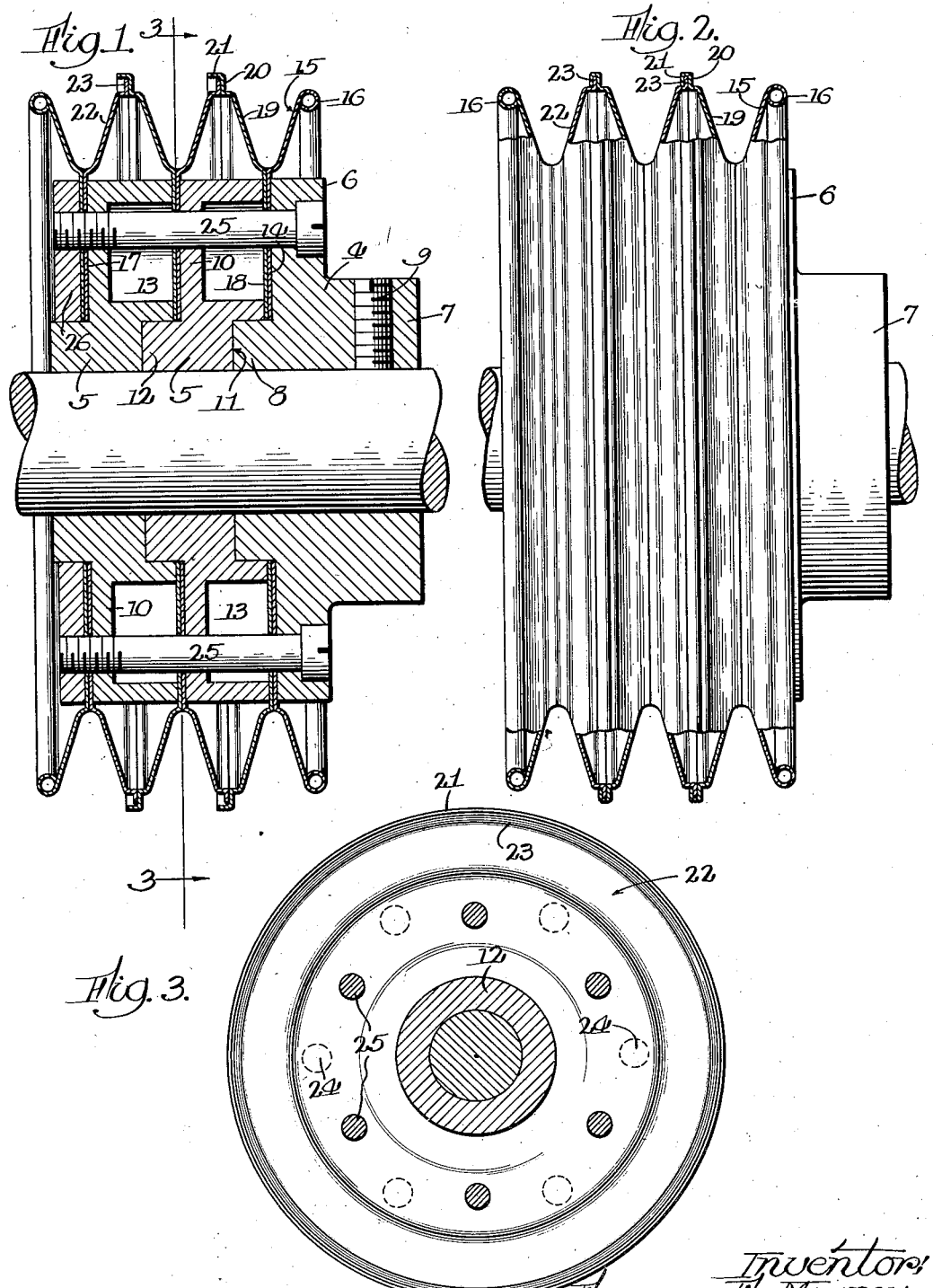
Inventor:
Eugene E. Maurey
BY: Glenn S. Noble Atty.

Patented June 25, 1935

2,006,145

UNITED STATES PATENT OFFICE 2,006,145

PULLEY

Eugene E. Maurey, Chicago, Ill.

Application October 31, 1932, Serial No. 640,474

4 Claims. (Cl. 74—230.8)

This invention relates to pulleys or sheaves and particularly those of the multiple groove type and to the method of constructing the same.

The objects of this invention are to provide an improved sectional or built up sheave or pulley which may be easily and rapidly manufactured and which will be particularly durable and efficient in operation; to provide a pulley which is made in part of sheet metal and in part of cast metal; to provide a pulley formed of a plurality of parts, some of which are duplicates, whereby a complete pulley having one or more grooves may be provided by assembling such parts and fastening the same together; to provide a pulley having sheet metal outer or grooved sections with inter-engaging or nesting hub sections formed of cast metal; to provide an improved method of making pulleys or sheaves; and to provide such other advantages in construction and in manufacture as will appear more fully from the following description.

In the accompanying drawing illustrating this invention;

Figure 1 is a longitudinal sectional view, of a partly completed pulley;

Figure 2 is a side view of a completed pulley with parts broken away to show the construction; and Figure 3 is a sectional view taken on the line 3—3 of Figure 1.

The particular form of the invention as shown in the drawing embodies a main hub section 4 and a plurality of auxiliary hub sections 5. The main hub section comprises a disc 6 having an outwardly projecting main hub portion 7 and an inwardly extending reduced portion 8. The pulley may be secured to the shaft in any desired manner as by means of a key (not shown) or a set screw 9 which passes through the hub portion 7. Each of the auxiliary hub sections, or parts forming the inner or body portion of the pulley comprises a disc-like portion 10 which is undercut or provided with an annular recess 11 which fits closely over the projection 8. The disc 10 also has a projection or reduced portion 12 on the opposite side which is similar to the projection 8 and which is adapted to fit into the recess 11 of the next intermediate section as will be readily seen from Figure 1. The outer portions of the discs 10 are approximately as wide as the pitch or distance between the grooves but are preferably recessed as shown at 13 to lighten the same.

The rim or peripheral portion of the pulley is made up of a plurality of suitably formed discs or annular plates which are secured together and to the center or hub portions in order to complete the structure. The end groove sections or discs 14 are made in the form of rings which fit over the projections 8 or 12 respectively with their outer peripheral portions 15 bent at any suitable angle to form one side of the groove. The edges of these discs are turned or rolled to form beads or false wires 16.

The intermediate rim members are of two forms 17 and 18 which are similar to the end members. The rim members 18 however have tapered or beveled outwardly extending groove portions 19 with flat radial projections 20 having flanges 21 at the outer edges thereof thereby forming cup-like recesses. The parts 17 also comprise rings adapted to fit over the projections 8 or 12 respectively and have beveled or tapered groove portions 22 with outwardly extending radial flanges or projections 23 which fit closely within the cup-like recesses in the outer peripheries of the coacting members 18.

In building up a sectional pulley constructed in this manner, the contiguous or contacting ring portions of the sections 17 and 18 are preferably welded together as by spot welding indicated at 24 preparatory to assembling the parts. One end section 14 and the adjacent intermediate section 18 which have thus been welded together are slipped onto the projection 8 and then an intermediate hub section 5 is cupped over the projection 8 and its outer sides will contact with the adjacent surface of the ring portion 18. Then a pair of sections 17 and 18 which have been welded together are slipped over the hub 12 and this is continued until any number of sections have been brought together. The sections are then fastened securely together by means of bolts or screws 25 which pass through holes in the hub sections and also in the rim sections and which engage with a collar or washer 26 which fits over the last projection 12 and which is provided with threaded holes for receiving the ends of the screws.

After the parts have been thus assembled the flanges 21 are bent or turned inwardly over the annular projections 23 as shown in Figure 2, so that the adjacent sections are seamed together and a smooth finish is provided. While I have for convenience, shown a pulley with three grooves it will be apparent that the pulley may be constructed with one or any number of grooves as desired, the only changes to be made being the length of the screws 25.

My improved invention not only provides means whereby a pulley may be built up with various numbers of sections but, on account of the simple shape of the parts, can be readily and economically manufactured. It will also be noted that the rim sections, being made of sheet metal, can not only be readily stamped out but require no finishing of the grooves and such metal provides a desirable surface for engagement with the belts. While I have shown V-shaped grooves, it will be obvious that such grooves may be made in any shape desired. Other modifications may also suggest themselves as coming within the scope of this invention and therefore I do not wish to be limited to the exact structure or method herein shown and described, except as set forth in the following claims, in which I claim.

1. In a sheave, the combination of a main hub section comprising a disc with hub portions extending on either side thereof, a plurality of intermediate duplicate hub sections, each of said intermediate sections having a recess on one side and a projection on the other side, said recesses being adapted to receive the projection of the adjacent main hub section or the adjacent intermediate section, pairs of rings formed of sheet metal fitting between the adjacent hub sections and welded together, the outer portions of said rings being beveled to form pulley grooves and having the outer peripheries of the adjacent groove portions seamed together, a ring fitting over the hub of the last intermediate section and having threaded holes therein, and screws extending through the hub sections and rings for fastening the parts together.

2. A sectional sheave comprising a plurality of discs each disc having a central annular recess on one side and an annular projection on the opposite side engaging with the recess in the adjacent disc, pairs of rings arranged between the discs, screws through said discs and rings, a washer having threaded holes for receiving the screws, said rings projecting outwardly beyond the discs and shaped to form grooves, the outer edges of the rings of the adjacent pairs being seamed together and the outer edges of the end rings being shaped to form beads.

3. In a multiple groove pulley, the combination of a main hub section comprising a disc with a hub portion extending therefrom, a plurality of intermediate duplicate hub sections, each of said intermediate sections having a recess on one side and a projection on the other, each recess being adapted to receive the projection of the adjacent hub section, pairs of rings fitting between the adjacent hub sections, the outer portions of said rings being beveled to form pulley grooves, a ring fitting over the hub of the last intermediate section, and means for fastening the hub sections and ring together.

4. In a multiple groove pulley, the combination of a main hub section comprising a disc with a hub portion extending therefrom, a plurality of intermediate duplicate hub sections, each of said intermediate sections having a recess on one side and a projection on the other side, each recess being adapted to receive the projection of an adjacent hub section, pairs of rings formed of sheet metal fitting between the adjacent hub sections, the outer portions of said rings being formed to provide pulley grooves and having their outer peripheries of the adjacent grooved portions secured together and bolts extending through the hub sections and rings for fastening the parts together.

EUGENE E. MAUREY.